US012558852B2

(12) United States Patent
Baldoy

(10) Patent No.: US 12,558,852 B2
(45) Date of Patent: Feb. 24, 2026

(54) METHOD FOR MANUFACTURING A POUCH FOR HOLDING THEREIN A LIQUID

(71) Applicant: CARGILL, INCORPORATED, Wayzata, MN (US)

(72) Inventor: Alberto Baldoy, Burguillos (ES)

(73) Assignee: Cargill, Incorporated, Wayzata, MN (US)

( * ) Notice: Subject to any disclaimer, the term of this patent is extended or adjusted under 35 U.S.C. 154(b) by 114 days.

(21) Appl. No.: 18/561,905

(22) PCT Filed: May 18, 2022

(86) PCT No.: PCT/US2022/029815
§ 371 (c)(1),
(2) Date: Nov. 17, 2023

(87) PCT Pub. No.: WO2022/245930
PCT Pub. Date: Nov. 24, 2022

(65) Prior Publication Data
US 2024/0278508 A1 Aug. 22, 2024

(30) Foreign Application Priority Data
May 20, 2021 (EP) ..................................... 21174963

(51) Int. Cl.
*B65D 75/30* (2006.01)
*B29C 65/22* (2006.01)
(Continued)

(52) U.S. Cl.
CPC ........... *B29C 65/221* (2013.01); *B65D 75/30* (2013.01); *B65D 75/5822* (2013.01); *B29L 2031/7128* (2013.01)

(58) Field of Classification Search
CPC ............................ B65D 75/30; B65D 75/5822
(Continued)

(56) References Cited

U.S. PATENT DOCUMENTS

| | | | |
|---|---|---|---|
| 5,308,163 A | 5/1994 | Abe | |
| 8,381,948 B1 * | 2/2013 | Jian | ................... B65D 75/5811 383/44 |
| 2013/0206259 A1 | 8/2013 | Liao | |

FOREIGN PATENT DOCUMENTS

| | | | |
|---|---|---|---|
| DE | 10007391 A1 | 5/2001 | |
| JP | 2000128193 A * | 5/2000 | |

(Continued)

OTHER PUBLICATIONS

Machine translation of JP-2000142735-A (Year: 2000).*

*Primary Examiner* — Jes F Pascua

(57) ABSTRACT

The invention provides a method of manufacturing a pouch for holding therein a liquid, comprising providing a front and back layer, locally bonding them together to create an inner space, forming a pour channel, by locally bonding the layers together to form bonds defining boundaries of the pour channel, wherein the forming of the pour channel is carried out by providing a heating device having a plurality of heating elements arranged in a grid-like manner, forming a heating surface, each of the heating elements being individually operable, operating the heating device such that heating elements which are required for creating the boundaries are operated and thereby heated, and bringing the heating surface into contact with the front layer or back layer, so as to locally bond together the front layer and the back layer so as to form the bonds defining the boundaries of the pour channel.

11 Claims, 3 Drawing Sheets

(51) Int. Cl.
    *B65D 75/58*         (2006.01)
    *B29L 31/00*         (2006.01)

(58) Field of Classification Search
    USPC ............................................ 383/42, 44, 906
    See application file for complete search history.

(56)                      References Cited

FOREIGN PATENT DOCUMENTS

| JP | 2000142735 | A | * | 5/2000 | |
| WO | 2013153104 | A1 | | 10/2013 | |
| WO | WO-2016002817 | A1 | * | 1/2016 | ............. B65D 75/58 |
| WO | 2020232201 | A1 | | 11/2020 | |

* cited by examiner

METHOD FOR MANUFACTURING A POUCH FOR HOLDING THEREIN A LIQUID

CROSS REFERENCE TO RELATED APPLICATIONS

This application is a national phase application of PCT Application No. PCT/US2022/029815, filed May 18, 2022, which claims the benefit of European Application No. 21174963.5 filed May 20, 2021, each of which is incorporated by reference herein in its entirety.

FIELD OF THE INVENTION

The present invention relates to a method of manufacturing a pouch for holding therein a liquid. In addition, the present invention relates to a pouch for holding therein a liquid, and to a use of such a pouch.

BACKGROUND

US 2006/0182370 A1 relates to a flexible container for holding a liquid including two walls made of a flexible material, the free overlaying edges of said walls being assembled together by a weld or an adhesive seam so as to define an inner sealed volume of the container. The two walls also define a spout. An obstacle, formed by welding or bonding together the two walls, is located in the inner volume opposite and close to the outflow channel. When liquid is present in the inner volume, a portion of the spout defined by the obstacle and by folds is deflected.

A known pouch for holding therein an edible liquid is made of a front and a back layer, defining an inner space for holding the liquid therein. For the purpose of pouring the liquid out of the pouch, the pouch has a pour spout made of a polymer block bonded between the front and back layers. The block has a pour channel passing through the block and a closing element such as a plug or cap. Such a pouch has a relatively high cost price and is relatively difficult to manufacture, mainly because of the pour spout design. Instead of the polymer block, such a pouch may have a pour spout having a long narrow pour channel defined by melting together the front and back layers. It is however difficult to accurately manufacture such pour spouts.

The present invention addresses one or more of the above problems.

STATEMENTS OF THE INVENTION

In one aspect, the invention relates to a method of manufacturing a pouch for holding therein a liquid, the method comprising:

providing a front and a back layer, locally bonding the front and back layer together in such a manner that an inner space of the pouch between the front and back layers is created by the bonding, which inner space is configured to hold the liquid, forming a pour channel, by locally bonding together the front layer and the back layer so as to form bonds defining boundaries of the pour channel, which pour channel allows liquid to flow from the inner space via the pour channel, in an outflow direction, out of the pouch, at least in an opened state of the pour channel in use of the pouch, wherein the forming of the pour channel is carried out by providing a heating device having a plurality of heating elements arranged in a grid-like manner, forming a heating surface, each of the heating elements being individually operable so as to create a part of a bond defining a boundary of the pour channel, operating the heating device such that heating elements, of the plurality of heating elements, which are required for creating the boundaries are operated and thereby heated, bringing the heating surface into contact with the front or back layer, so as to locally bond together the front layer and the back layer so as to form the bonds defining the boundaries of the pour channel.

The local bonding for the purpose of forming the bonds defining the boundaries of the pour channel may be done subsequent to the local bonding for the purpose of creating the inner space. In other embodiments, the bonding for the purpose of forming of the pour channel may be done prior to, or at least partially at the same time as, the bonding for the purpose of creating the inner space. The step of operating the heating device such that elements are heated is preferably carried out prior to, but may also be carried out at least partially at the same time as or after bringing the heating surface into contact with the front or back layer.

In another aspect, the invention relates to a pouch for holding therein a liquid, wherein the pouch has been manufactured in accordance with the method of manufacturing according to the invention, the pouch having a front layer and a back layer bonded together, an inner space of the pouch between the front and back layers, defined by the bonding, and configured to hold the liquid. The pouch comprises a pour channel allowing liquid to flow from the inner space via the pour channel, in an outflow direction, out of the pouch, at least in an opened condition of the pour channel in use of the pouch. The pour channel has been formed by locally bonding together the front layer and the back layer so as to form bonds defining boundaries of the pour channel.

In a further aspect, the invention relates to a pouch for holding therein a liquid, having a front layer and a back layer bonded together, an inner space of the pouch between the front and back layers, defined by the bonding, and configured to hold the liquid. The pouch comprises a pour channel allowing liquid to flow from the inner space via the pour channel, in an outflow direction, out of the pouch, at least in an opened condition of the pour channel in use of the pouch. The pour channel has been formed by locally bonding together the front layer and the back layer so as to form bonds defining boundaries of the pour channel, wherein the pour channel is designed such that, in use, a liquid flow resistance of the pour channel is larger in the outflow direction than in an opposite inflow direction, that means than in an inflow direction which is against the outflow direction.

In yet a further aspect, the invention relates to a use of such a pouch, for holding therein a liquid.

Below several preferred features of the invention are disclosed. These features are applicable to the method of manufacturing, to the pouch, and to the use of the pouch, in accordance with the present invention.

An advantage of the method according to the invention, is that by the specific steps of forming of the pour channel, a very accurately shaped pour channel may be created between the front and back layers, including relatively complex shapes, or, channel layouts, and that without the need for an additional component such as a mentioned block-shaped pour spout. So, no additional elements are needed; the pouch may be created only using the front and back layers, which may be flexible monomaterials. By doing so, a sustainable packaging design is obtained, valid for recycling streams. Such an accurately shaped pour channel makes it possible to control an outflow of liquid from the pouch to a large extent and for example to design the pour channel such that it obtains a valve-like behaviour. Although a pouch manufactured in such a manner, according to the present invention, thus has a highly accurate pour spout, it has a low cost price can also be very easily and efficiently manufactured.

During the step of operating the heating device, heating elements required for creating boundaries of the pour channel are operated and thereby heated, while remaining heating elements, not required for creating such boundaries, may not be operated and may thus not be heated such that at the location of such remaining heating elements, the front and back layers are not mutually bonded.

As a consequence of bringing the heating surface into contact with the front or back layer and operating and thereby heating elements, the front layer and the back layer will be locally welded together, or, will locally be heat sealed. The local bonding of the front and back layer together in such a manner that an inner space of the pouch between the front and back layers is created, may also be done by locally welding, or, heat sealing said layers.

In an example of the invention, that means of the method, pouch and use according to the invention, the pour channel may be designed, and formed by the local bonding, such that, in use in the opened state, a liquid flow resistance of the pour channel is larger in the outflow direction than in an inflow direction which is against the outflow direction.

DESCRIPTION OF THE DRAWINGS

The present invention is described hereinafter with reference to the accompanying schematic drawings in which examples of the present invention are shown and in which like reference numbers indicate the same or similar elements.

DETAILED DESCRIPTION

Figure 1:
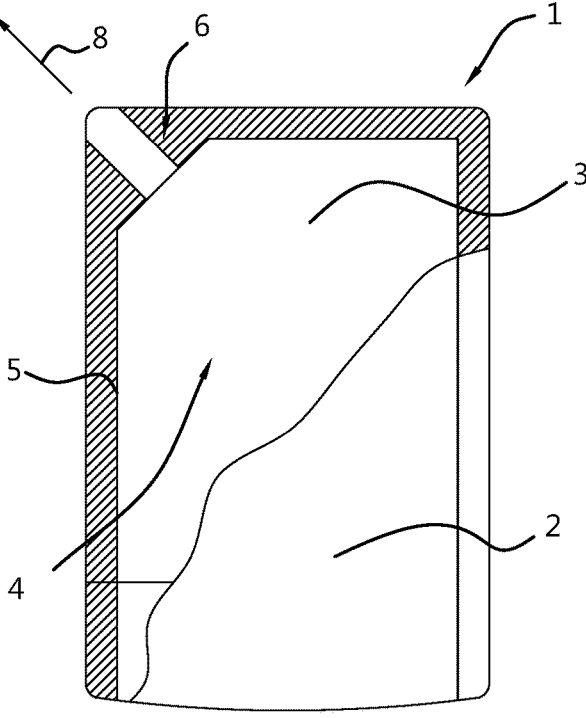
FIG. 1 shows, in front view, an example of a pouch according to the present invention.

Unless otherwise defined or specified, all terms should be accorded a technical meaning consistent with the usual meaning in the art as understood by the skilled person.

All parameter ranges include the end-points of the ranges and all values in between the end-points, unless otherwise specified.

When used in these specification and claims, the terms "comprises" and "comprising" and variations thereof mean that the specified features, steps or integers are included. The terms are not to be interpreted to exclude the presence of other features, steps or components.

Within the scope of the present description and claims, the term liquid is considered to also cover emulsions, semiliquids, which include liquid butter, tomato sauce and mayonnaise, for example. The liquid may in embodiments of the invention be chosen from a group consisting of hydrophilic liquids, such as aqueous media, hydrophobic liquids, such as oils, emulsions, and more paste like materials like tomato paste, liquid butter and mayonnaise but also including herbs paste, tooth paste, cosmetic gels, the liquid preferably being an edible oil.

Each of the plurality of heating elements may have a length and a width, at the heating surface and in the plane of the heating surface, both in the range of 1 to 5 mm, the length and the width preferably being equal or at least substantially equal, for example 3 mm, wherein the grid forming the heating surface has at least ten, preferably between 15 and 50, heating elements in a length direction and in a width direction. A shape at the heating surface of heating elements of the plurality of heating elements may be formed depending on the required shape of the bonds, and thereby channel boundary, to be formed. This may further increase the accuracy.

The front layer and the back layer may both be made of a polymer chosen from the group consisting of thermoplastic polymers, including co-polymers, or blends thereof, the polymer preferably being selected from the group consisting of polypropylene (PP), polyethylene (PE), polyhydroxyalkanoate (PHA), polylactic acid (PLA).

Preferably the polymer is a polymer that can be heat sealed. In an embodiment having a front and/or back layer being a multilayer material, at least the inner layer comprises a polymer that can be heat sealed.

The specific pour channel design and its method of manufacturing according to the invention may be used with various pouch designs, including the flat four side-sealed pouch design shown in the figures, but also three side sealed pouches, stand up pouches and gusseted pouches such as side gusseted pouches, for example.

The front layer and the back layer as provided may in an embodiment be or at least originate from separate pieces of starting material, preferably wherein the front layer is made of the same material as the back layer. The front layer and the back layer as provided may in another embodiment be part of one integral piece of starting material. By the latter is meant that the step of providing the front and back layer may be carried out by providing one integral sheet of material, a part thereof constituting the front layer and another part thereof constituting the back layer of the pouch to be manufactured. Such an integral sheet of material may for example be folded so as to provide the front layer and the back layer and it may then be bonded together such as at three overlapping edges (the forth edge being at the fold line). Alternatively it may be folded and bonded such that a center sealed pouch results, for example.

The pour channel may have a main channel defining a main flow path in the outflow direction, and may have a plurality of branched channels each branching off from the main channel, wherein each of the plurality of branched channels opens back into the main channel in a backflow direction which is at least partially against the outflow direction. Such a channel design is known under the name "Tesla valve". Such a channel design is for example disclosed in U.S. Pat. No. 1,329,559. Such a pour channel design may provide a significant and gradually increasing resistance in the outflow direction, which provides a highly controllable resistance. The plurality of branched channels may be located on either side of the main channel, preferably in a staggered manner. Generally, for liquids of a relatively higher viscosity, less such branched channels may be needed compared to liquids of a relatively lower viscosity.

The pour channel may have an outflow opening via which the liquid may flow out of the pouch, wherein the pour channel may have been designed such that a liquid pressure of the liquid at the outflow opening, in the absence of external forces on the pouch, is below a predefined threshold value. By this is meant that if the pouch is not in use and has been stored on a supporting surface like a shelf, the liquid pressure is below a predefined threshold value.

The pour channel may have an outflow opening via which the liquid may flow out of the pouch, wherein the pour channel has been designed such that the front and back layer, at the outflow opening, remain in contact with each other when a pressure of the liquid at the outflow opening in the outflow direction is below a predefined threshold value. A pressure of the liquid at the outflow opening in the outflow direction above the threshold value may force the front and back layer apart at the location of the outflow opening, thereby letting liquid flow out of the pouch. The front and back layer, at the outflow opening, may remain in contact with each other as a result of the resilience of the layers, as long as said pressure is below said threshold value. In particular using a pour channel design having the main channel and branched channels, this may be achieved in a controlled and predictable manner.

The pouch may further have a tear-off zone, in a first state thereof closing off a liquid outflow opening of the pour channel so that the pour channel is in a closed state thereof, and having a second state in which at least a part of the tear-off zone has been removed by a user of the pouch so that the pour channel is in the opened state thereof and liquid may be poured out of the pouch. Further tear-off zones may be defined in the pouch, for tearing off a part of the pour channel for further decreasing a flow resistance in the outflow direction. To this end, the pouch may contain visual indicators and/or tear-off starting provisions like a recess or recesses. For example, when more outflow is desired upon exerting a certain external pressure on the pouch, a user may tear off an additional tear-off zone and thereby a part of the pour channel.

FIG. 1 shows a pouch 1 for holding therein a liquid. The liquid may be an edible substance such as an edible oil or tomato paste, for example. The pouch 1 has a front layer 2 and a back layer 3. The back layers is shown in FIG. 1 in the lower right corner, where a part of the front layer has been left out in the drawing so as to display the back layer 3. The front layer 2 and back layer 3 are bonded together, in the present example along their periphery, the bond indicated by the dashed line 5. The mentioned bonding, that means the bonds resulting of the bonding, define an inner space 4 of the pouch between the front 2 and back 3 layer. The inner space 4 is configured to hold the liquid. The front and back layer may be of a polymer like polypropylene, for example. However, the material of the front and back layers may be chosen based on properties of the liquid and based on customer demands, for example. The front and/or back layers may individually be a multilayer product, so as to meet demands on the inside, that means in the inner space, and on the outside of the pouch.

Figure 2A:
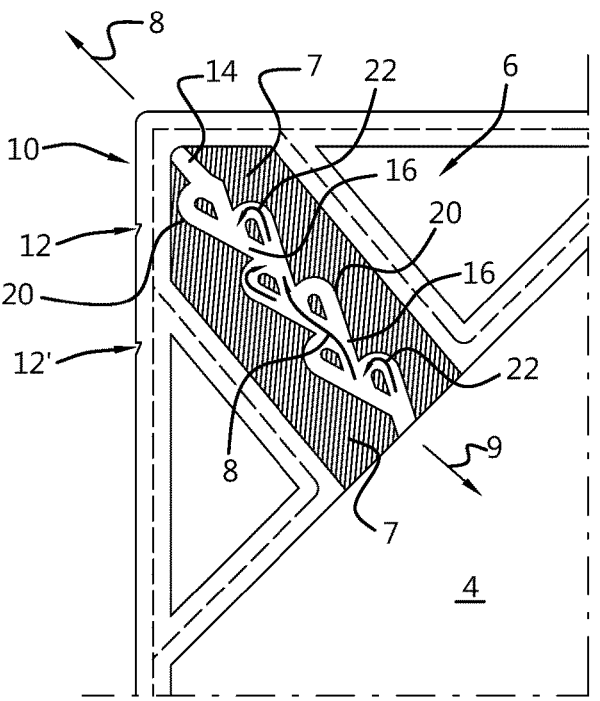
FIG. 2a shows, in front view, a detail of the pouch of FIG. 1.
Figure 2B:
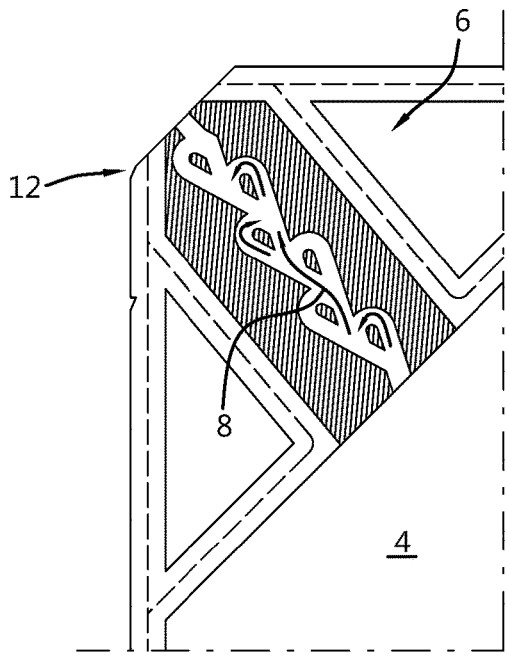
FIG. 2b shows the detail of FIG. 2a in a state wherein a tear-off zone has been removed.

The pouch 1 comprises a pour channel 6 (details of the pour channel not shown in FIG. 1; see FIG. 2a) allowing liquid to flow from the inner space 4 via the pour channel 6, in an outflow direction 8, out of the pouch 1, at least in an opened condition of the pour channel 6 in use of the pouch 1. For this purpose, the pouch 1 has a tear-off zone 10, which can be torn off starting from a recess 12 in the form of a small cut-out portion for providing an intuitive starting point for tearing off the tear-off zone 10. FIG. 2b shows the pouch in a state wherein the tear-off zone 10 has been removed. The tear-off zone 10, in a first, original state thereof, closes off a liquid outflow opening 14 of the pour channel 6 so that the pour channel 6 is in a closed state thereof, and having a second state in which at least a part of the tear-off zone 10 has been removed by a user of the pouch 1 so that the pour channel 6 is in the opened state thereof and liquid may be poured out of the pouch 1 via the now exposed outflow opening 14.

The pour channel 6 has been formed by locally heat sealing together the front layer 2 and the back layer 3 so as to form bonds 7 defining boundaries of the pour channel 6. The local bonding for the purpose of forming of the pour channel may be done subsequent to the mentioned bonding for the purpose of defining the inner space. In other embodiments, the bonding for the purpose of forming of the pour channel may be done prior to or at least partially at the same time as the bonding for the purpose of defining the inner space. The pour channel 6 is designed such that, in use, a flow resistance of the pour channel 6 is larger in the outflow direction 8 than in an opposite inflow direction 9. This has been realised by designing the pour channel 6 such that it has a main channel 16 through which liquid in use flows in the outflow direction 8, and a plurality of branched channels 20 each branching off from the main channel 16, wherein each of the plurality of branched channels 20 opens back into the main channel 16 in a backflow direction 22 which is at least partially against the outflow direction 8. See FIG. 2a. The pour channel 6 has a free downstream end, forming the outflow opening 14, via which the liquid may flow out of the pouch 1, wherein the pour channel 6 has been designed such that a pressure of the liquid at the outflow opening 14, in the absence of external forces on the pouch, is below a predefined threshold value. This may be achieved by the specific pour channel design as discussed above.

Optionally, a further tear-off zone may be present, to be torn off starting from a further recess 12' in case desired such as to further reduce outflow resistance. In the example shown in FIG. 2a, the recess 12' would result in the tearing off of the two most downstream branched channels 20.

Figure 3:
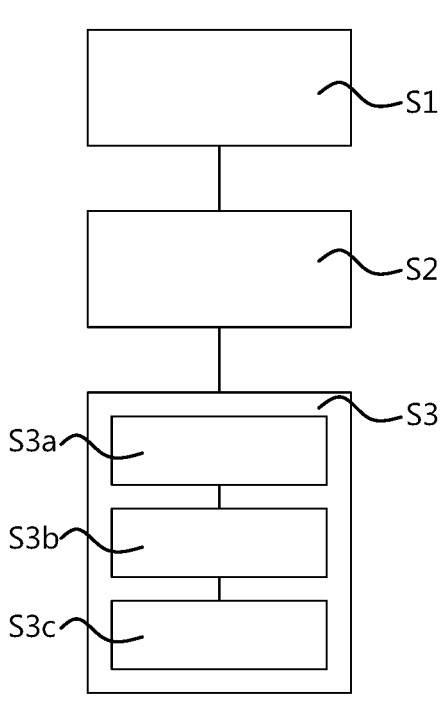
FIG. 3 shows an example of a method according to the present invention.

A pouch such as the above described pouch 1 may efficiently and easily be manufactured by means of a method of manufacturing a pouch for holding therein a liquid, wherein the method may comprise:

providing a front 2 and a back 3 layer (step S1 in FIG. 3).

locally bonding the front 2 and back 3 layer together in such a manner that an inner space 4 of the pouch 1 between the front 2 and back 3 layers is created by the bonding, which inner space 4 is configured to hold the liquid (step S2). Such local bonding may be done by bringing a heating surface into contact with the front 2 or back 3 layer, so as to locally bond together the front layer 2 and the back layer 3 so as to form the bonds defining the inner space 4. For example, the bonds may be made along a periphery of the pouch to be formed.

forming a pour channel 6 (step S3), by locally bonding together the front layer 2 and the back layer 3 so as to form bonds 7 defining boundaries of the pour channel 6, which pour channel 6 allows liquid to flow from the inner space 4 via the pour channel, in an outflow direction 8, out of the pouch 1, at least in an opened state of the pour channel 6 as described above.

Figure 4:
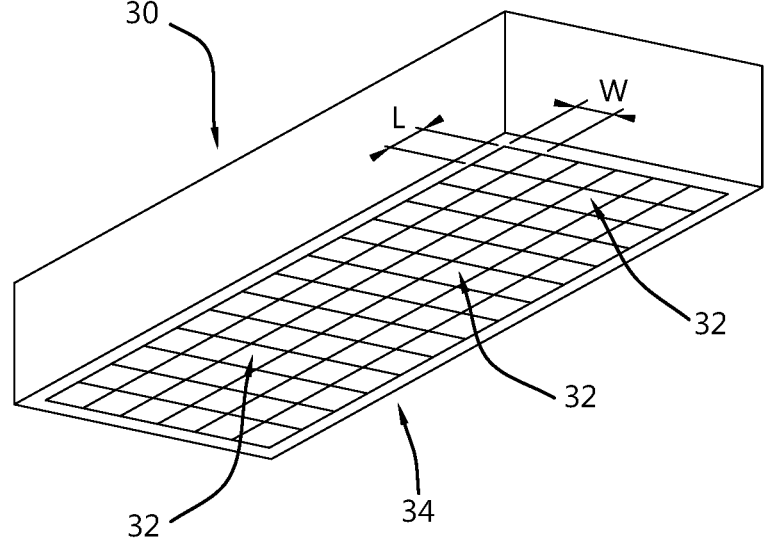
FIG. 4 shows an example of a heating device for use in a method according to the present invention.
Figure 5:
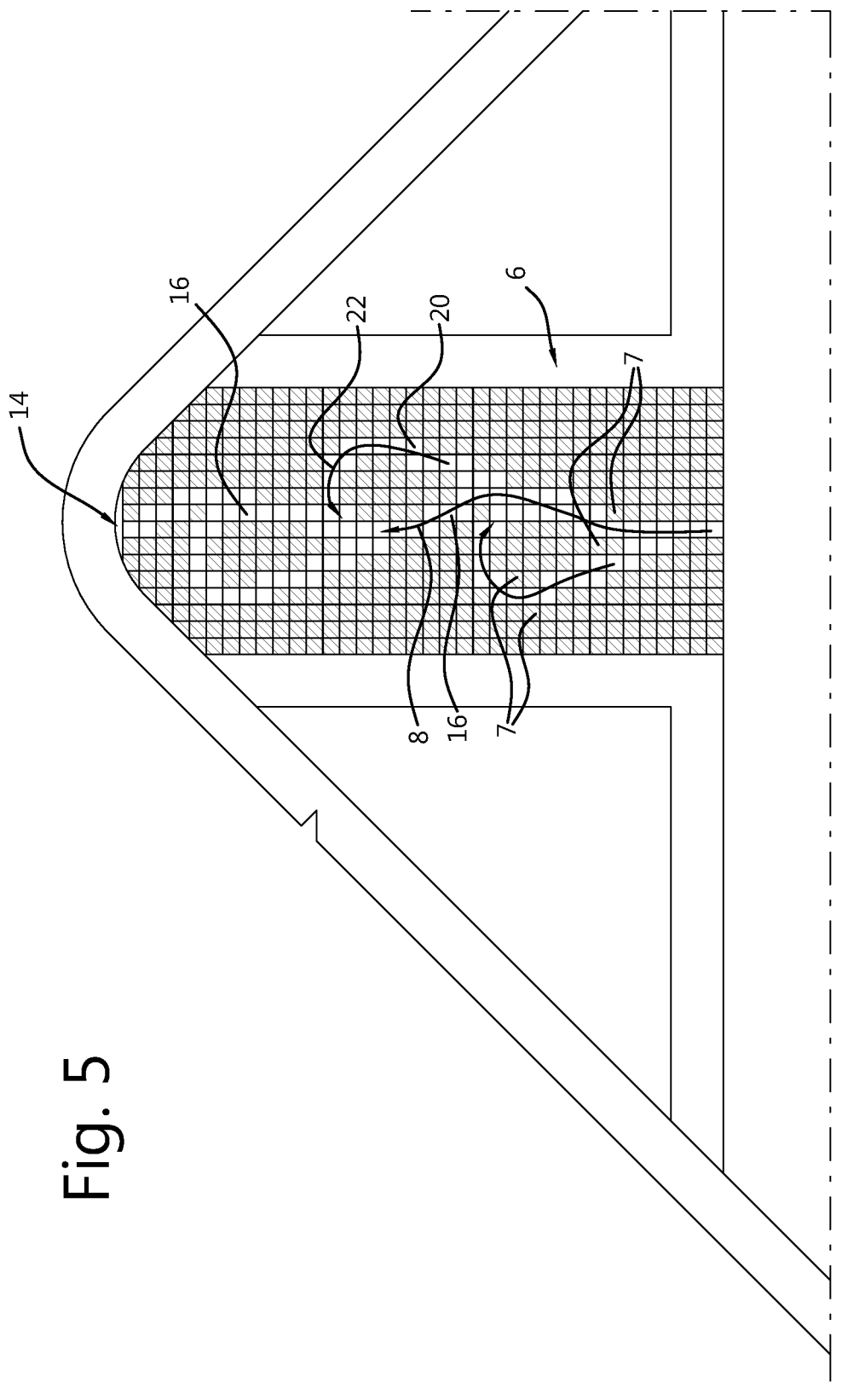
FIG. 5 shows the result of a method step of a method according to the present invention.

The forming of the pour channel 6 may be carried out by providing a heating device 30 having a plurality of heating elements 32 arranged in a grid-like manner as FIG. 4 shows, the plurality of heating elements forming a heating surface 34, each of the heating elements 32 being individually operable so as to create a part of a bond 7 defining the boundary of the pour channel 6 (step S3*a*).

operating the heating device 30 such that heating elements 32, of the plurality of heating elements, which are required for creating the boundary are operated and thereby heated (step S3*b*). Heating elements of the plurality of heating elements which are not required for creating the boundary are thus not operated and thus not heated.

bringing the heating surface 34 into contact with the front 2 or back 3 layer, for example the front layer 2, so as to locally bond, by welding, or, heat sealing, together the front layer 2 and the back layer 3 so as to form the bonds 7 defining the boundaries of the pour channel 6 (step S3*c*). This is schematically represented in FIG. 5, wherein the pour channel has been defined by zones in which the front and back layers have not been bonded. FIG. 5 shows the manufacturing principle of a pouch according to the invention. Contrary to the pouch shown in FIGS. 2*a* and 2*b*, in FIG. 5 a pour channel having three branched channels 20 has been drawn.

In another embodiment, step S2 is executed at the same time as step S3. In a further embodiment, step S3 is executed prior to step S2. Also, the execution of steps S2 and S3 may partially overlap. The step of operating the heating device such that elements are heated is preferably carried out prior to, but may also be carried out at least partially simultaneously with or after bringing the heating surface into contact with the front or back layer.

The heating elements of the heating device 30 have a length L and a width W, at the heating surface 34 and in the plane of the heating surface 34. Both the length L and the width W may be in the range of 1 to 5 mm and are preferably equal, such as 3 mm, wherein the grid forming the heating surface 34 has at least ten, preferably between 15 and 50, heating elements 32 in a length direction and in a width direction.

Although certain aspects of the invention have been described, the scope of the appended claims is not intended to be limited solely to the examples. The claims are to be construed literally, purposively, and/or to encompass equivalents.

The invention claimed is:

1. A pouch for holding therein a liquid, the pouch comprising:

a front layer and a back layer bonded together;

an inner space of the pouch between the front and back layers, defined by the bonding, and configured to hold the liquid; and a pour channel defined by the bonding and allowing liquid to flow from the inner space via the pour channel, in an outflow direction, out of the pouch, at least in an opened condition of the pour channel in use of the pouch, the pour channel comprising a main channel through which liquid may flow in the outflow direction, and a plurality of branched channels each branching off from the main channel, wherein each of the plurality of branched channels opens back into the main channel in a backflow direction which is at least partially against the outflow direction.

2. The pouch according to claim 1, wherein the pour channel is designed and formed by the local bonding such that, in use in the opened state, a liquid flow resistance of the pour channel is larger in the outflow direction than in an inflow direction which is against the outflow direction.

3. The pouch according to claim 1, wherein the pour channel has an outflow opening via which the liquid may flow out of the pouch, wherein the pour channel has been designed such that the front and back layers, at the outflow opening, remain in contact with each other when a pressure of the liquid at the outflow opening in the outflow direction is below a predefined threshold value, and wherein a pressure of the liquid at the outflow opening in the outflow direction above the threshold value forces the front and back layers apart at the location of the outflow opening, thereby letting liquid flow out of the pouch.

4. The pouch according to claim 1, further having a tear-off zone, in a first state thereof closing off a liquid outflow opening of the pour channel so that the pour channel is in a closed state thereof, and having a second state in which at least a part of the tear-off zone has been removed by a user of the pouch so that the pour channel is in the opened state thereof and liquid may be poured out of the pouch.

5. The pouch of claim 1, wherein the front layer and the back layer are both made of a polymer chosen from the group consisting of thermoplastic polymers, including copolymers, and blends thereof.

6. The pouch of claim 5, wherein the polymer is selected from the group consisting of polypropylene (PP), polyethylene (PE), polyhydroxyalkanoate (PHA), and polylactic acid (PLA).

7. A pouch for holding therein a liquid, the pouch comprising:

a front layer and a back layer bonded together;

an inner space of the pouch between the front and back layers, defined by the bonding, and configured to hold the liquid;

a pour channel allowing liquid to flow from the inner space via the pour channel, in an outflow direction, out of the pouch, at least in an opened condition of the pour channel in use of the pouch, wherein the pour channel is formed by the front layer and the back layer that are bonded together so as to form bonds defining boundaries of the pour channel, the pour channel comprising a main channel through which liquid may flow in the outflow direction, and a plurality of branched channels each branching off from the main channel, wherein each of the plurality of branched channels opens back into the main channel in a backflow direction which is at least partially against the outflow direction.

8. The pouch of claim 7, wherein the front layer and the back layer are both made of a polymer chosen from the group consisting of thermoplastic polymers, including copolymers, and blends thereof.

9. The pouch of claim 8, wherein the polymer is selected from the group consisting of polypropylene (PP), polyethylene (PE), polyhydroxyalkanoate (PHA), and polylactic acid (PLA).

10. The pouch of claim 7, wherein the pour channel is formed by a plurality of heating elements arranged in a grid-like manner.

11. The pouch of claim 7, wherein during use, a liquid flow resistance of the pour channel is larger in the outflow direction than in an inflow direction which is against the outflow direction.

* * * * *